Oct. 15, 1968  B. MIGNEN  3,405,995
PREFORMED BLANK FOR MULTIFOCAL LENS
Filed Jan. 21, 1964  2 Sheets-Sheet 1

INVENTOR
BERNARD MIGNEN
By Irwin D. Thompson
ATTY.

Oct. 15, 1968   B. MIGNEN   3,405,995
PREFORMED BLANK FOR MULTIFOCAL LENS
Filed Jan. 21, 1964   2 Sheets-Sheet 2

INVENTOR
BERNARD MIGNEN
By Irvin S. Thompson
ATTY.

United States Patent Office 3,405,995
Patented Oct. 15, 1968

3,405,995
PREFORMED BLANK FOR MULTIFOCAL LENS
Bernard Mignen, Saint-Maur-des-Fosses, France, assignor to L.O.R. Lentilles Ophtalmiques Rationnelles Société Anonyme, Paris, France, a corporation of France
Filed Jan. 21, 1964, Ser. No. 339,265
Claims priority, application France, Feb. 14, 1963, 924,784
3 Claims. (Cl. 351—168)

ABSTRACT OF THE DISCLOSURE

A preformed blank for manufacturing a multifocal lens is concavo-convex and has two optically polished faces. A first near vision zone is formed on one face on one side of the axis of the lens blank, while a second near vision zone is formed on the other face but on the side of the lens blank axis which is opposite the first near vision zone. One or the other of two different multifocal lenses may be produced from one blank, by machining one face or the other to a desired curvature.

---

It is known that the most widely used method for the manufacture of ophthalmic lenses is to produce them by casting a liquid monomer in a glass mould and then polymerising the monomer.

By this method and by using a mould with optically polished faces, it is possible to obtain finished ophthalmic lenses directly, and particularly bi-focal ophthalmic lenses. In the latter case, the part which forms the addition, that is to say the area used for near sight, is formed by a hollow or a projection with a polished surface, made in or on one of the faces of the mould.

Moreover, it has already been suggested that moulded preformed blanks should be produced, that is to say rough blanks of lenses, one single face receives in moulding its final finish, and the other face, which after moulding has a coarser surface, is subsequently finished by a surfacing operation of the usual kind and is given the required degree of curvature during the surfacing operation.

This process was described in the applicant's French Patent No. 1,133,705 filed Oct. 15, 1955.

Preformed shapes have seldom been produced, in particular for multifocal lenses having special axes or having unusual powers in which only the face with the zones for near sight, and if required intermediate sight, is given its final polishing in the moulding, the other face having a coarser surface when ground.

Such prefabricated shapes in particular make a reduction possible in the stock carried by workshops which provide multifocal ophthalmic lenses under prescription.

It is a main object of the present invention to provide preformed multi-focal lenses which enable these stocks to be still further reduced.

According to the invention there is provided a preformed blank for a multi-focal lens in which near vision zones are formed on the two faces of the blank, which faces are optically polished, so that by subsequent machining of one or other of these faces to a desired curvature, one or other of two multi-focal lenses of different types can be produced from the same preformed blank.

The invention also comprehends a method of manufacturing a multi-focal lens, comprising moulding a preformed lens blank with near vision zones formed on the two faces of the blank, which faces are optically polished in the moulding operation, and subsequently machining either face of the blank to a desired curvature to produce a multi-focal lens of desired form. Owing to this it is possible to practically halve the number of preformed blanks which workshops require to stock.

Figure 1:
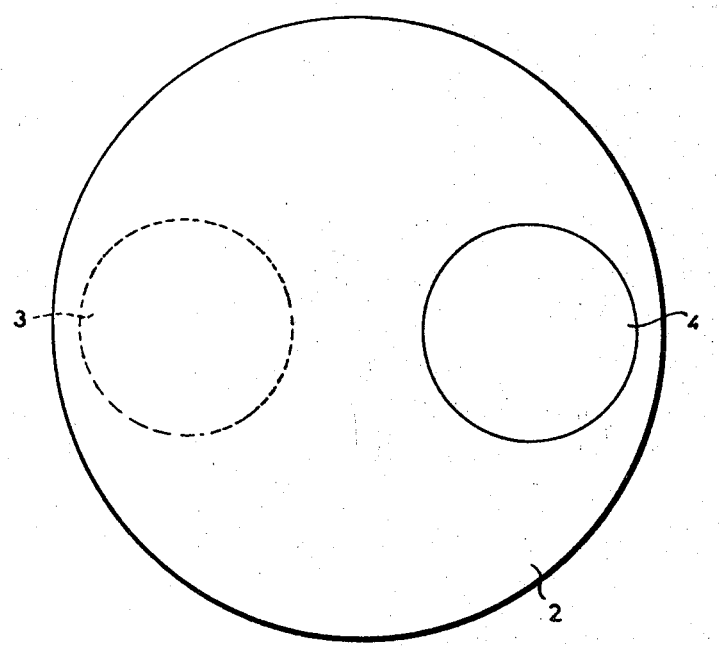
Figure 2:
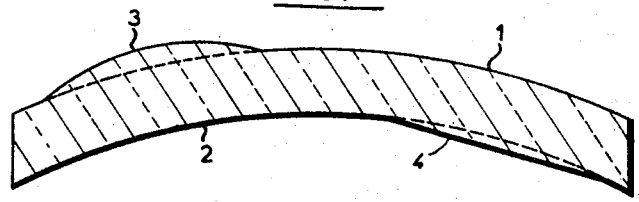
Figure 3:
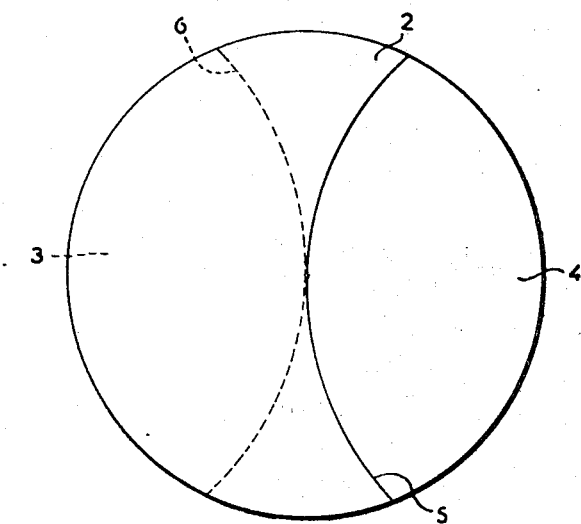
Figure 4:
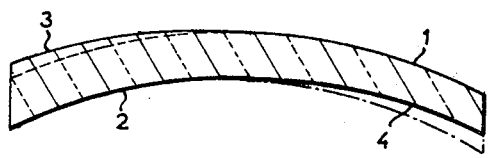

In order that the invention may be more clearly understood some embodiments thereof will now be described, by way of example, with reference to the accompanying drawing in which:

FIGURES 1 and 2 are two views respectively showing in plan and in axial section an embodiment of a preformed blank according to the invention, and FIGURES 3 and 4 are two views respectively in plan and in axial section of a variant of this preformed blank according to the invention.

A preformed blank according to the invention, in the embodiment illustrated in FIGURES 1 and 2, consists of a lens with a convex face 1 and a concave face 2, having for example equal curvatures (+3 and −3 respectively in this example). On the convex face is formed a near sight zone 3, circular in shape, projecting from the said face, and on the concave face 2 is arranged a second near sight zone 4 also of circular contour.

Preferably the two zones 3 and 4 constitute two additions having the same dioptric power, for example +2 dioptres.

In this example, these two zones are arranged symmetrically in relation to the centre of the lens but they can equally be arranged in any manner relative to each other, each being naturally formed on a separate face of the lens.

The preformed blank is produced directly by polymerising a monomer resin in a mould having two mirror-polished faces, which are complementary to the two faces of the lens and each comprise in particular a depression the polished face of which is of complementary shape to that in the corresponding zone 3 or 4.

A preformed blank thus produced enables either a concave power lens to be produced if the convex face 1 is conserved, with the addition 3 and the concave face 2 is machined to the desired curvature; or if a convex power lens is desired, the concave face 2 is conserved, with the addition 4, and the convex face 1 is machined to the required curvature.

Such a preformed blank, the cost of production of which is hardly greater than that of a preformed blank having only a single finished face, enables the quantity of preformed blanks which any workshop specialising in the surfacing of multi-focal ophthalmic lenses must keep in stock, to be reduced by half.

The invention is not confined to preformed blanks of the kind described with reference to FIGURES 1 and 2 and these preformed blanks may have many variations. One of such variations is shown in FIGURES 3 and 4.

The preformed blank is again constituted by a lens having a convex face 1 and a concave face 2, but the corresponding near vision zones 3 and 4 respectively are limited by circular arcs 5 and 6 passing through the centre of the lens and extending outwards to the edge of the lens.

In this case the near vision zone 4 formed in the concave face is inset relative to that face. The corresponding mould face has a projecting portion for forming this zone.

It is also possible to provide according to the invention preformed shapes for multi-focal lenses, the two faces of which when finished each has one or several intermediate zones as well as the near vision zone.

I claim:

1. A preformed molded lens blank for a multifocal lens, said blank being concavo-convex and having both faces optically polished, a first near vision zone on the convex face of the blank on one side of the axis of the blank, and a second near vision zone on the concave face of the blank on the side of the blank axis which is diametrically opposite the first near vision zone, and each near vision zone being disposed in the area occupied by a far vision zone on the opposite face of the blank, whereby subsequent machining of one or the other of the optically polished faces to a desired single power curvature enables one or the other of two multifocal lenses of different types to be produced from the same preformed blank.

2. A lens blank as claimed in claim 1, said first near vision zone being of less radius of curvature than the rest of said convex face of the lens blank, said second near vision zone being of greater radius of curvature than the rest of the concave face of the lens blank.

3. A lens blank as claimed in claim 2, the radius of curvature of the convex face of the lens blank outside said first near vision zone being substantially the same as the radius of curvature of the concave face of the lens blank outside said second near vision zone.

References Cited

UNITED STATES PATENTS 2,209,587   7/1940   Tillyer _____ 351—168

FOREIGN PATENTS 872,811   7/1961   Great Britain.
1,217,892   12/1959   France.

DAVID H. RUBIN, *Primary Examiner.*